March 27, 1973 C. B. GREENBERG ET AL 3,723,155
WET CHEMICAL METHOD OF PRODUCING TRANSPARENT METAL FILMS
Filed July 23, 1970 5 Sheets-Sheet 1

INVENTORS
CHARLES B. GREENBERG
ROY G. CRISSMAN
BY Chisholm and Spencer
ATTORNEYS March 27, 1973   C. B. GREENBERG ET AL   3,723,155
WET CHEMICAL METHOD OF PRODUCING TRANSPARENT METAL FILMS
Filed July 23, 1970   5 Sheets-Sheet 2

INVENTORS
CHARLES B. GREENBERG
ROY G. CRISSMAN
BY Chisholm and Spencer
ATTORNEYS

United States Patent Office 3,723,155
Patented Mar. 27, 1973

3,723,155
WET CHEMICAL METHOD OF PRODUCING
TRANSPARENT METAL FILMS
Charles B. Greenberg, Turtle Creek, and Roy G. Crissman, Lower Burrell, Pa., assignors to PPG Industries, Inc., Pittsburgh, Pa.
Filed July 23, 1970, Ser. No. 57,527
Int. Cl. B32b 17/06; B44d 1/08; C03c 17/10
U.S. Cl. 117—35 S                               19 Claims

ABSTRACT OF THE DISCLOSURE

This invention relates to wet chemical methods of providing non-conductive transparent substrates with a transparent coating having a metallic luster and good uniformity. Especially valuable transparent substrates are provided in which the contemplated coatings are certain boron containing metal films. Transparent articles having especially attractive neutral colored films of nickel have been provided. Other articles having films of cobalt and/or iron have also been provided.

As one embodiment, this invention relates to the formation of extremely uniform transparent metal-boron films, such as nickel-boron, cobalt-boron, iron-boron or mixtures thereof on transparent plates of glass. These films may be produced by certain essential steps involving: activating a glass substrate in a conventional manner, i.e., by contacting the glass with a dilute aqueous solution of a stannous salt to sensitize said glass; thereafter contacting said glass with an aqueous palladium salt to further activate said glass; and then spraying two aqueous alkaline solutions—one containing a chelated metal salt and the other containing a borohydride reducing agent—onto said activated glass to form a transparent metal and boron containing film by reduction of the metal salt. Transparent viewing closures which exhibit a controlled transmittance and reflectivity (within limits specified herein), which are substantially free from localized deviations that are visible to the eye, and which reflect a large percentage of the solar radiation impinged thereon are produced in this manner.

CROSS REFERENCES TO RELATED APPLICATIONS

This application is related to Ser. No. 829,755, filed June 2, 1969, now U.S. Pat. No. 3,672,939, issued June 27, 1972. This application is also related to Ser. Nos. 57,451, 57,575 now abandoned and 57,754, now U.S. Pat. No. 3,674,517 issued July 4, 1972, filed on even date herewith in the name of R. G. Miller, and entitled "Wet Chemical Method of Producing Transparent Metal Films," "Transparent Metal-Boron Coated Glass Articles" and "Solution For Depositing Transparent Metal Films," respectively.

BACKGROUND OF THE INVENTION

In the past, transparent metal coated glass articles have been produced by various vapor deposition techniques which generally involve the deposition, from the vapor phase, of substantially pure metals, such as, nickel or chromium on a prepared glass substrate. However, while such techniques are generally capable of providing metal films of acceptably uniform thickness and specified visual transparency, commercial films of this type have been observed to possess an undesirably high number of visible pin-holes. Further, this process is expensive and complex.

Metal coated metallic and non-metallic articles have been produced by various well-known electroless or chemical plating techniques. These techniques generally involve the immersion of metallic article or a sensitized non-metallic article into a suitable electroless plating bath comprising an aqueous medium having dissolved therein a metal salt and an appropriate reducing agent, whereupon a metal film is deposited upon the immersed article by an autocatalytic mechanism.

The electroless process is an old and established one. For example, Brenner and Riddell disclosed in 1944 that an opaque coating of nickel could be autocatalytically deposited upon metallic substrates by immersing the substrates into a nickel salt solution containing sodium hypophosphite. U.S. Pats. 2,532,283 and 2,532,284 were issued to Brenner and Riddell upon their discoveries. The use of sodium hypophosphite as the reducing agent results in deposits which are not pure metal, but which contain about 2 to 10 percent elemental phosphorous by weight. In this connection, it is known that the presence of phosphorous in a deposited nickel film affects certain of the film's characteristics, including its dominant wavelengths, infra-red absorption characteristics, excitation purity and electroconductivity. In addition, and for reasons not wholly understood, it has been found that the uniformity of deposited nickel-phosphorous films generally decreases rapidly with an increase in the thickness of the coated glass substrates beyond about three-sixteenths of an inch thick.

Other electroless immersion plating processes involve the use of boron-containing reducing agents which are effective at room temperature. U.S. Pat. 2,968,578, U.S. Pat. 3,140,188, U.S. Pat. 3,096,182 and U.S. Pat. 3,045,334 are representative of improved electroless plating processes of this type. U.S. Pat. 2,956,900 of Carlson et al. describes a spraying process wherein two separate solutions are sprayed upon substrates to form nickel coatings. This process uses sodium hydrosulfite and sodium hypophosphite as reducing agents.

To a large extent the prior art has been concerned with production of opaque coatings by electroless coating, although it is understood that the assignee of U.S. Pat. No. 2,702,253 produces a glass plate having a transparent nickel coating possibly by the process therein disclosed. The problem of producing transparent glass or like articles is much more difficult because relatively minute variations in thickness are readily visible to the naked eye as unsightly defects. Other variations in such coatings can provide streaks where the glass appears almost opaque due to reflection of light in an otherwise transparent glass plate.

Many solutions suggested by the prior art develop a coating of gradually increasing thickness well beyond thicknesses which are opaque. The production of uniform transparent films with such solutions is especially difficult.

SUMMARY OF THE INVENTION

According to this invention, transparent substrates such as glass have been provided with very uniform transparent coatings by contacting the glass simultaneously with a mixture of the reducible metal salt in a solution and a reducing agent, which mixture becomes rapidly depleted of its film-forming capacity before the resulting coating becomes opaque.

As will be explained more fully hereinbelow, the mixtures contemplated herein will produce a uniform coating at a rate which is relatively rapid and then relatively slower and which effectively ceases to produce coating while the coating remains transparent. According to this invention, it has been found that by using such mixtures and discontinuing the contact therewith after the rate of deposition of coating has reached the slower rate, transparent films of improved uniformity with few or no pin holes can be achieved. It has further been found that coatings of the best uniformity may be obtained even with large plates having 4 or more square feet of surface when the coating is applied by separately spraying a solution of reducing agent and a solution of the reducible metal salt on the glass plate preferably while the major surfaces thereof are in a horizontal or substantially horizontal plane. This process has been found to be effective over a broad temperature range for coating any of the so-called catalytic metal substrates or non-catalytic substrates sensitized in a conventional manner to promote deposition of continuous, adherent transparent metal films. However, one of the marked advantages of this process is that it will deposit highly uniform transparent films when performed at about room temperature, i.e., from about 20 to 30° C. We have found that in order to insure that each of a plurality of substrates is provided with a coating that exhibits substantially the same physical and chemical characteristics, it is advantageous that the process temperature be held constant to within about ±1° C., for example, over 100 substrates or over 1000 square feet of substrate, or the like. Best uniformity and appearance of transparent films is achieved when films are deposited to a thickness having a luminous transmission of about 35-40 percent or less, and when the films comprise nickel boron, cobalt-boron, iron-boron, and the like. Films comprising mixtures of boron and nickel, cobalt and/or iron may also be provided. In all such films, the boron is present in a minor amount (rarely exceeding about 15 percent by weight and normally between about 2 and 7 percent by weight) while the metal (nickel, cobalt and/or iron) is present in preponderant amounts (rarely less than about 85 percent by weight and normally between about 93 and 98 percent by weight).

The transparent substrates thus obtained may be employed, for example, as transparent windows or outside walls in a building such as a skyscraper or other multi-story structure. These substrates may be especially advantageously employed as one of the plates which make up multiglazed units as described in assignee's copending application Serial No. (not yet assigned), filed on even date herewith and entitled "Transparent Metal-Boron Coated Glass Articles." It will be understood that uniformity of coating in such uses is especially important because otherwise the reflected color of portions of the building differs sharply from that of other portions, thus detracting from its appearance.

The coated glass is capable of inhibiting transfer of radiant heat such as that from the sun's rays by the light reflectance of the film and the fact that it permits transmittance of less than 35 to 40 percent of visible light from sunlight. Panels having light transmittance of 5 to 25 percent are especially useful in warm to temperature climate such as the U.S.A. In other climates such as Northern Europe, panels of greater transmittance are preferred.

The color of the panels is dependent upon the metal which is reduced. Especially attractive nickel-boron coatings which have a neutral color reflecting and passing essentially white light are provided according to this invention. Cobalt coatings are blue while iron coatings are brown. Other colors can be obtained by producing mixtures of these coatings.

The nickel-boron and like metal-boron compounds herein contemplated are unusually electroconductive. Thus, these films may be used as heating elements. For example, in the double glazed panel comprising two spaced glass panels enclosed by a glass, metal or organic sealing around the edge of the panel, one such panel may be coated on its interior side by the process of this invention. By applying an electromotive force across this coating, heat may be generated in the panel thus minimizing or preventing substantial heat loss from the interior of the building in which such panels are mounted.

Coatings having one or more of the desirable properties set forth above are effectively produced according to this invention by spraying as hereinafter disclosed in greater detail. Such process is especially valuable in producing uniform coatings on large articles such as plates of glass or other substrates having one dimension in excess of three feet, with the other being in excess of 1.5 feet, for example, panels of three feet by six feet or larger.

Immersion processes have serious disadvantages. These disadvantages are especially acute where transparent coatings are desired since, for example, the composition of the plating bath changes during use, thereby requiring frequent chemical analysis and addition of materials to maintain a constant bath composition. If a constant bath composition is not maintained, the metal films formed therein will not be uniform. In this latter connection, it should be appreciated that contamination of a bath composition, which may be caused, for example, by an inadvertent admixture therewith of the solutions employed to activate the glass being coated, will necessitate a complete shut-down of the process and a renewal of the bath. Furthermore, immersion processes are not especially adaptable to forming transparent films inasmuch as the rate of deposition is difficult to control. Thus, it is relatively common for a heavier coating to be deposited on that portion of a substrate which is first to enter and last to leave the plating bath.

DETAILED DESCRIPTION

As pointed out hereinabove, one feature of the present invention resides in employing a film forming composition that deposits a film or coating at a rate which is relatively rapid and then relatively slower and which effectively ceases to produce coating while the coating remains transparent. Stated differently, the invention contemplates intermixing an aqueous solution of a metal compound and a reducing agent for the contemplated metal so as to provide a film forming composition that becomes substantially completely depleted of its film forming capacity within a matter of minutes, preferably within about 1 to 3 minutes, and before any film deposited thereby becomes opaque.

One such film forming composition may be prepared by intermixing separate sprays of a specifically formulated solution of a metal compound, preferably a nickel compound, and a specifically formulated boron-containing reducing solution, preferably comprising an alkali metal borohydride; the separate solutions being formulated as follows:

Metal containing solution

In accordance with one embodiment of the present invention, the metal containing solution may comprise an aqueous solution of a metal selected from the group consisting of nickel, iron and cobalt, and mixtures thereof, usually in the form of (a) a water soluble metal salt of an inorganic or organic acid, preferably the latter, especially acetic acid, (b) a small amount of an organic or inorganic acid, usually a weak acid, and preferably boric acid, (c) a complexing or chelating agent such as gluconic acid or an alkali metal salt thereof, preferably sodium gluconate, (d) a hydrazine compound such as hydrazine, hydrazine hydrate, hydroxylamine, phenylhydrazine, or hydrazine tartrate, and especially hydrazine sulfate or other hydrazine salts, and (e) sufficient alkaline material, preferably in the form of a weak base, such as ammonium hydroxide, to maintain the pH of the solution above pH 7, generally between about pH 7 and pH 11, and preferably between about pH 7.2 and pH 7.6. In a preferred embodiment, the metal containing solution also includes (f) certain non-ionic or cationic wetting agents which are known not to precipitate heavy metals from solution. Examples of such wetting agents include certain organic amine-ethylene oxide condensates such as Ethomeen C–15 and Ethomeen C–20 of Armour and Company, described more fully below. The usual solvent for these components is water. However, water may be replaced partially or even completely with an organic solvent such as lower alcohols, i.e., ethyl alcohol.

As mentioned above, various salts of the contemplated metals and inorganic and organic acids soluble in aqueous solutions may be utilized. Metal salts having only slight solubility in aqueous solutions may be utilized inasmuch as active concentrations of the salt of the metal to be plated range from about 0.05 percent by weight to about 20 percent by weight of the solution. A preferred concentration is from about 0.5 percent by weight to about 10 percent by weight of the metal salt, e.g. the nickel salt, per unit weight of solution. Furthermore, the valence state of the soluble metal ion appears to be unimportant. For example, cobaltous or cobaltic salts are generally equally effective.

Typical salts of organic acids useful in this invention include: nickel acetate, nickel propionate, nickel citrate, nickel tartrate, cobalt acetate, cobalt citrate, iron acetate and the like, mixtures thereof and salts of solvent organic acids generally containing less than about 12 carbon atoms.

Typical inorganic soluble metal salts useful in this invention include: nickel chloride, nickel bromide, nickel iodide, nickel sulphate, nickel fluoroborate, cobalt bromide, cobalt chloride, cobalt fluoride, iron chloride, iron bromide, iron sulphate and the like and mixtures thereof.

The formation of transparent films of metals such as nickel, cobalt, iron and mixtures thereof has been found to be greatly facilitated by the presence of boric acid. Other acids such as acetic acid, propionic acid, citric acid, tartaric acid, and the like may be employed. Boric acid has been found to promote film uniformity and to reduce the tendency of the metal film to peel from the substrate during drying. For best results, it is desirable to include boric acid in the metal containing solution even though additional acids may be present. The quantity of boric acid employed may vary over a relatively wide range. For example, a metal containing solution comprising from about 0.050 percent to about 3.5 percent by weight boric acid is suitable. However, the use of a metal containing solution comprising from about 0.2 to about 1.0 percent boric acid is preferred.

A chelating agent, i.e. a compound which readily complexes metal ions in water solution, is effective in the alkaline metal containing solution to prevent precipitation of the dissolved metal compound. The preferred chelating agent is gluconic acid, or an alkali metal salt thereof, especially sodium gluconate. However, known chelating agents such as citric acid, glycolic acid, ethylene diamine, lactic acid, ethylene diamine tetracetic acid and the like are useful. The formation of transparent metal films of good optical characteristics is enhanced by the utilization of gluconic acid or sodium gluconate, especially the latter. The quantity of chelating agent utilized should be that which is sufficient to maintain the metal compound in solution at the contemplated operating temperatures. Generally, chelating agents are utilized in a mole-to-mole ratio for each mole of metal ion present, although it has been found that lesser quantities are effective with the dilute coating solutions of this invention. Thus, while good coatings are produced from metal solutions having a molar ratio of chelating agent to metal ion as low as 1:4, a molar ratio between about 1:2 and 3:1 is preferred for deposition of transparent metal films.

It has been found that the inclusion of certain compounds containing the radical linked to an inorganic radical or another nitrogen atom as part of the metal salt solution greatly enhances the quality of the resulting deposited film produced using a borohydride as a reducing agent. Thus, substantially mottle-free, uniform, and fine-textured films are obtained when from about 0.01 percent by weight to about 1.0 percent by weight of the metal salt solution comprises hydrazine tartrate, hydrazine hydrate, hydroxylamine, phenylhydrazine, hydroxyl ammonium sulfate, and the like, and particularly hydrazine sulfate. Particularly high quality films are obtained when the metal salt solution comprises from about 0.04 to about 0.06 percent by weight of the above-described nitrogen-hydrogen type compounds, especially hydrazine sulfate. In this regard, it has been observed that the presence of such hydrazine compounds slightly retards the rate of film deposition. Accordingly, it is believed that the added hydrazine compound acts as a complexer and leveling agent that controls the rate of release of the metal ions from the complex thereof.

As pointed out briefly above, the inclusion of certain wetting agents as part of the metal salt solution has been found particularly effective for the deposition of transparent films of metals, for example, nickel, cobalt, iron, and the like. In this connection, certain non-ionic and cationic wetting agents which are known not to precipitate heavy metals from solution are generally preferred. Wetting agents particularly useful for this purpose include:

Cationic agents such as:
(1) quaternary ammonium salts, for example, tetramethyl ammonium chloride and dipropyl dimethyl ammonium chloride; and
(2) alkylene oxide condensation products of organic amines wherein a typical structure is wherein R is a fatty alkyl group preferably having about 12 to 18 carbon atoms, and $x$ and $y$ represent whole numbers from 1 to about 20, typical products of this type being ethylene oxide condensation products of cocoamines, soybean amines, and the like, having an average molecular weight of about 200 to about 3,000.

Non-ionic agents such as:
(1) Alkylene oxide condensates of amides, for example, hydrogenated tallow amides having a molecular weight of about 200 to about 300, and oleyl amides wherein a typical structure is wherein R, $x$ and $y$ have the same significance as set forth immediately above for organic amine condensates; and
(2) Alkylene oxide condensates of fatty acids.

When employed in very small amounts ranging generally from about 0.001 to about 0.1 percent by weight of metal salt solution, e.g. from about 10 to about 1000 milligrams per liter of solution, and preferably from about 25 to about 100 milligrams per liter of solution, wetting agents of the above types are generally useful in promoting film uniformity. Of particular utility are the alkylene oxide condensation products of organic amines which have been found to promote substantially mottle-free transparent films of nickel, cobalt, iron and mixtures thereof formed by the spray process described herein. Organic amine-ethylene oxide condensates having a molecular weight of greater than about 300 have been found especially effective for this purpose. Typical of these condensates is Ethomeen C-15 of Armour and Company, described hereinafter in the examples.

Thus, it will be appreciated that a particularly suitable metal containing solution for production of a nickel coating may comprise a formulation within the ranges set forth in Table 1.

TABLE 1
Aqueous metal solution

| Ingredient: | Concentration grams/liter |
|---|---|
| Nickelous acetate | 0.5–50 |
| Boric acid | 0.5–35 |
| Sodium gluconate | 1.0–75 |
| Hydrazine sulfate | 0.1–5.0 |
| Wetting agent | 0.01–1.0 |
| pH (adjusted with ammonium hydroxide) | 7.0–10.5 |

The metal salt solution is preferably formed by dissolving a desired quantity of metal salt in water and adding the desired amount of chelating agent. Next, the desired amount of a nitrogen-hydrogen type compound is dissolved separately in a minimum amount of water and added to the complexed metal salt. Boric acid is preferably added next and then the pH of the solution is adjusted to about pH 7 or greater with an alkaline material, preferably a hydroxide. Boric acid may be added before the chelating and nitrogen-hydrogen type agents, but the addition of these agents preferably precedes the addition of any alkaline materials.

To achieve the activity hereindescribed and to ensure provision of a filming composition which loses its ability to provide a coating before any coating produced thereby has become opaque, the alkalinity of the metal containing solution should be maintained or buffered between a pH of 7 and 9.5, preferably between 7.2 and 7.6. Alkaline materials generally may be used for pH control although hydroxides such as sodium, potassium, and ammonium hydroxide are preferred, with best results being achieved with ammonium hydroxide. Such a solution is stable over long periods of time in the absence of the reducing agent. However, when mixed with the reducing agent it functions rapidly to produce a coating on a sensitized or catalytic surface. Concurrently, metal precipitates from solution and thus the solution becomes spent within a matter of two to three minutes, in any event less than five minutes.

As pointed out briefly above, the temperature of the metal containing solution may vary over a relatively wide range so long as it is uniform from substrate to substrate. For example, uniform, transparent films may be deposited from a metal containing solution maintained at a temperature between about 35° F. and 100° F. Practically speaking, however, it is preferable to maintain the temperature of the metal containing solution between about 50° F. and about 90° F., and most preferable to maintain the temperature between about 60° F. and 85° F.

Reducing solution

The reducing solution comprises an aqueous solution of a boron-containing reducing agent and has a pH greater than 7, preferably greater than about 9, inasmuch as boron-containing reducing agents oxidize very rapidly in acid and neutral solutions. Such solutions are comparatively stable. To achieve the rapid activity desired after the reducing solution is added to the metal solution, it is preferred that the pH of the intermixed solution, that is, the filming composition formed by intermixing the metal and reducing solutions at the surface of the substrate being coated, be at least 7, but below 9.5, and preferably between about 7 and 8.5. Best quality transparent films are formed when the reducing solution is maintained at a pH of about 11 to 12.5; the most preferred range of pH being from about 11.2 to about 11.7. Thus, the pH of the intermixed solution may be readily controlled by control of the respective reducing and metal solutions.

The boron-containing reducing agent may be present in the reducing solution in an amount equal to from about 0.01 to about 5.0 percent by weight based upon the weight of the reducing solution. While boron-containing reducing agents are effective in the aforementioned range, a preferred concentration of about 0.03 to about 1.0 percent by weight of reducing agent based upon the weight of the reducing solution is preferred. The balance of the solution usually is water although organic solvents such as the lower alcohols may be used if desired.

Exceptionally useful boron-containing reducing agents are the alkali metal borohydrides such as sodium borohydride, and potassium borohydride.

It has been found that films having superior uniformity and texture are obtained when the reducing solution includes a small amount of a wetting agent of the type described above to facilitate proper intermixing with the metal containing solution. In this connection, it has been found that from about 0.001 to about 0.1 percent by weight, e.g., from about 10 to about 1000 milligrams of wetting agent per liter of solution and preferably from about 10 to about 50 milligrams of wetting agent per liter of solution is generally sufficient for this purpose.

Thus, it will be appreciated that a particularly suitable boron-containing reducing solution may advantageously comprise a formulation within the ranges set forth in Table 2.

TABLE 2
Aqueous reducing solution

| Ingredient: | Concentration |
|---|---|
| Sodium borohydride | 0.1–25 grams/liter. |
| pH (adjusted with sodium hydroxide) | 10–12.5. |
| Wetting agent | 0.01–1.0 grams/liter. |

Process

While the principles of the present process are equally appropriate with respect to batchwise and continuous deposition techniques, they are particularly advantageous when utilized in continuous spray deposition techniques. Accordingly, the following description and illustrative examples are directed primarily to such continuous spray techniques.

In a typical embodiment, the metal containing solution and reducing solution are each passed through separate spray guns and projected against the surface of the articles being coated so that the sprays intermix and uniformly contact the surface of articles to be coated, the articles advancing relative to the spray guns. In a preferred embodiment, the separate sprays are applied to the article simultaneously to facilitate proper intermixing. After remaining on the surface of the articles for a period of time sufficient to substantially deplete the intermixed solution of its filming capacity, the spent or dead solution is washed off.

Since an intermixed solution prepared in accordance with the present invention will always become depleted of its filming capacity before any film deposited thereby becomes opaque, the articles being coated are generally sprayed several times with fresh solution to build up the thickness and to achieve the desired lowered light transmittance. Thus, depending upon the various deposition parameters such as the concentration and pH of the intermixed solution, the spraying sequence may be repeated for each article as many times as necessary to prepare a final film thickness having the desired degree of transparency.

In typical practice, each of the metal and reducing solutions is sprayed separately, but preferably simultaneously, onto the precleaned and activated surfaces to be coated at a flow rate varying from about 10 to about 1500 milliliters per minute per square foot of activated surface. Of course, the actual flow rate that is employed depends upon the concentration of the intermixed filming solution, the temperature and pH thereof, the transparency of the desired coating, the respective positions of the spray guns employed, the rate of advancement of the activated surfaces relative to the spray guns, and the like. Generally speaking, however, it is desirable to maintain the flow rates of the respective solutions such that the molar ratio of the boron-containing reducing agent and the metal being reduced vary from about 1:3 to about 3:1.

As discussed more fully hereinbelow, it has been found generally preferable to employ multiple gun sets when carrying out the process of this invention on a commercial scale. In this connection, each gun set would comprise a spray gun for the metal containing solution and a spray gun for the reducing solution, each operated at a flow rate varying from about 300 to about 2000 milliliters of solution per minute per gun.

Generally speaking, the process is quite effective at temperatures in the range of from about 35° F. to about 100° F., although operation at about room temperature is preferred. It is necessary to maintain a uniform process temperature to ensure that the luminous transmission of each coated substrate is within acceptable limits of a preselected desired value. In this connection, it has been found that holding the process temperature constant to within about ±1° C. is adequate for this purpose.

The substrate must be receptive to metal deposition. For the deposition of films of nickel, cobalt, iron, and mixtures thereof, it is important to have a reactive surface on the substrate. Thus, in the formation of a transparent article, an appropriate substrate is a transparent glass plate activated and perhaps even coated by treatment of the surface thereof with an aqueous solution of a palladium salt of another activating metal, for example, copper, aluminum, tungsten, cobalt, platinum, silver, boron, thallium, vanadium, titanium, nickel, gold, germanium, silicon, chromium, molybdenum, iron, tin, lead, indium, cadmium, zinc, and the like. This treatment renders the surface active so that the nickel or like metal coating will form on the activated surface thereof when the reducing agent and the metal plating solution are applied thereto. Quite possibly, this activation produces a transparent metal coating although applicant does not wish to be bound by any theoretical explanation of the function of the activation. However, a transparent copper film may be deposited on a transparent glass or plastic substrate by means of vacuum deposition or sputtering, whereafter the copper coated substrate could be sprayed according to the teaching of this invention with a transparent coating of nickel, cobalt, iron, or a mixture thereof.

A further method of preparing the substrate for chemical deposition according to this invention may be accomplished in accordance with the teachings of U.S. Pat. 2,702,253 or U.S. Pat. 3,011,920, the teachings therein being incorporated herein by reference.

The invention will be more fully understood and appreciated in view of the following description of a preferred embodiment thereof selected for purposes of illustration and shown in the accompanying drawings wherein.

Referring now to FIGS. 1–7, there is shown one embodiment of an apparatus suitable for coating a monolithic substrate such as a glass plate with a transparent metal and boron containing film in accordance with the present invention. As shown, the apparatus comprises five basic units or sections, which are designated the glass loading and cleaning section (section 100), the glass sensitizing and activating section (section 200), the metal-boron deposition section (section 300), the glass drying section (section 400) and the film density measuring and glass unloading section (section 500). The apparatus also comprises a conveyor means including a plurality of belts 1 in section 100 and rollers 2 in sections 200–500 for carrying and advancing monolithic glass plates 3 past the various sections 100–500 in the direction illustrated by the arrows y. As explained below, the belts 1 and rollers 2 are rotated by conventional means (not shown) so as to advance the plates 3 at a rate of from about 0.5 to about 5 feet per minute, and preferably from about 3 to about 4 feet per minute.

Figure 3:
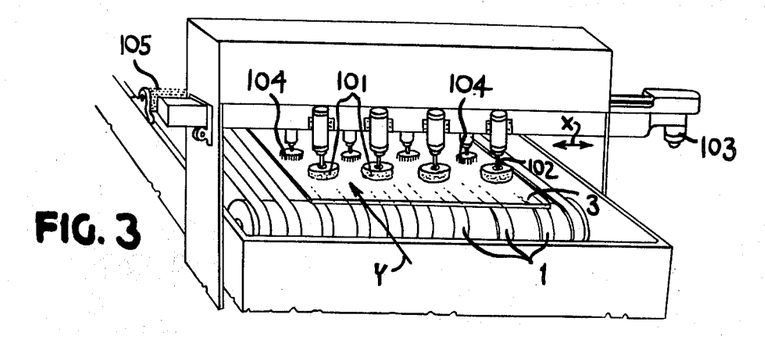
FIG. 3 is a partial perspective view of the glass loading and cleaning section of the apparatus of FIG. 1.

During continuous operation, a plurality of glass plates 3 are serially loaded onto the belts 1, so that they advance into and pass through section 100 of the apparatus. In this section, a plurality of rotating discs or blocks 101 gently abrade the uppermost surface of each plate, preferably with a mixture of cerium oxide or red rouge and water, to loosen and remove the dirt therefrom. This blocking operation is preferably carried out with cattle hair felt blocks having a diameter of from about 4 to about 12 inches. Each of the blocks are mounted to a shaft 102 which is rotated by a suitable motor 103 and gear means (not shown) at a rate of about 200 to 600 revolutions per minute. In a preferred embodiment, the blocks are rotated at about 300 to 500 revolutions per minute and are oscillated, for example, a distance of about 2 to 4 inches in the direction transverse to the advancing plate to ensure that the entire uppermost surface of the plate is blocked. While still in section 100, each plate advances beneath a plurality of rotary cup brushes 104 that wash the surface of the plate with tap water. The brushes 104, which may have nylon bristles or the like, are generally rotated at the same rate as the blockers 101, and are preferably oscillated in the same manner as well. Each plate finally advances beneath a rotary cylinder brush 105 (FIGS. 1 and 2) disposed transversely of the advancing plate. The brush 105 may comprise nylon bristles or the like which contact the plate and complete the cleaning thereof. The brush is generally rotated at about 300 to 400 revolutions per minute. Both the rotary cup brushes 104 and the rotary cylinder brush 105 may be driven by conventional means (not shown).

Figure 1:
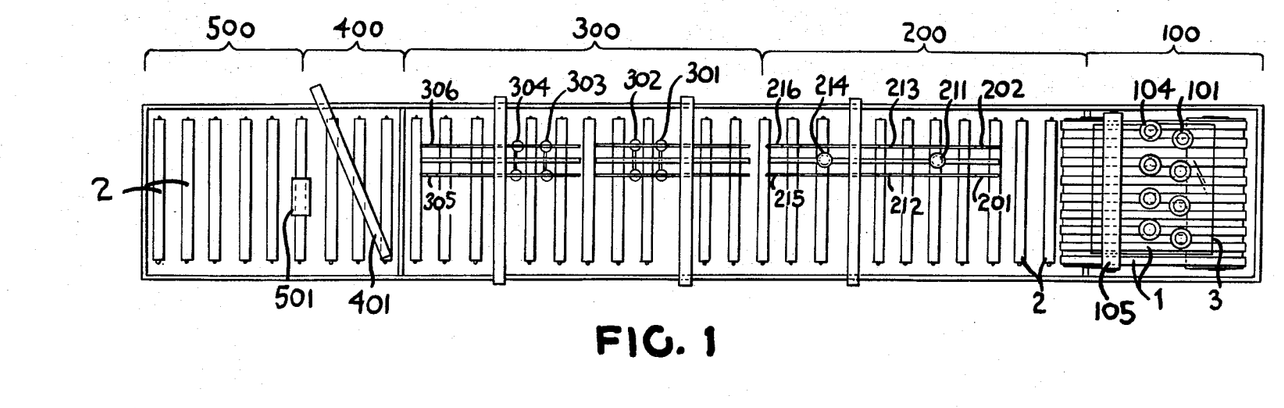
FIG. 1 is a schematic top plan view, with portions removed for the sake of clarity, of an apparatus suitable for carrying out the process of the present invention on a continual basis, wherein section 100 represents a glass loading and cleaning section, section 200 represents a sensitizing and activating section, section 300 represents a metal-boron deposition section, section 400 represents a drying section, and section 500 represents a film density measuring and unloading section.
Figure 2:
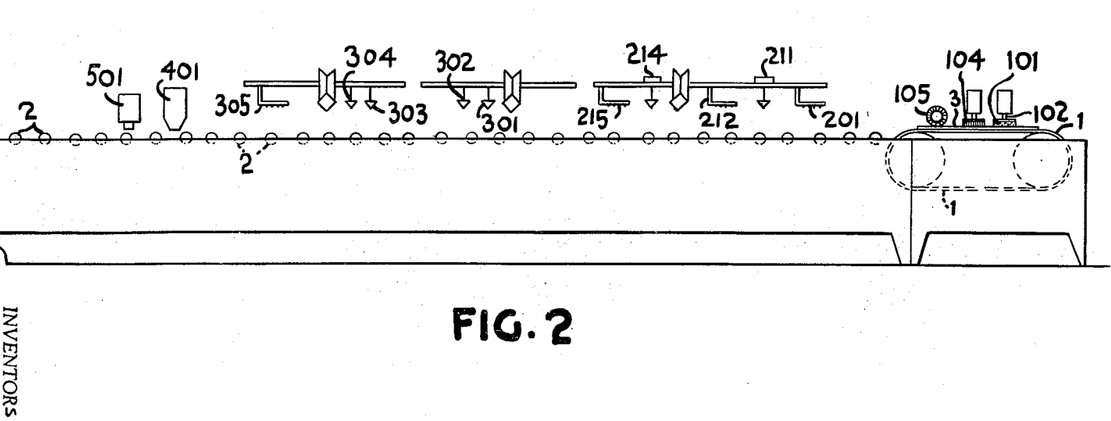
FIG. 2 is a schematic front elevation of the apparatus of FIG. 1.
Figure 4:
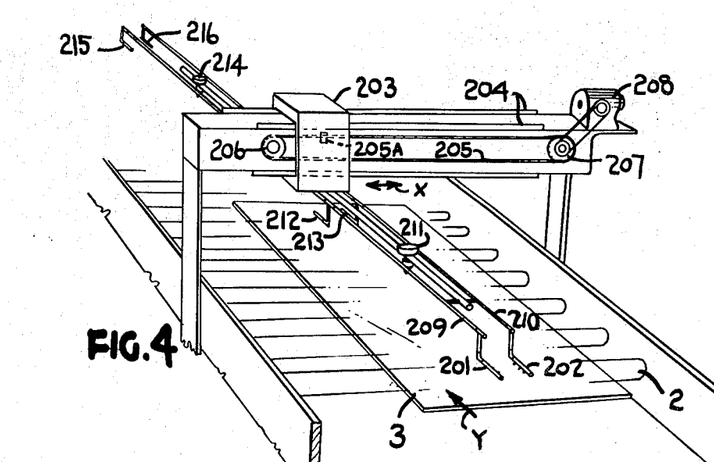
FIG. 4 is a partial perspective view of the sensitizing and activating section of FIG. 1.

Each plate 3 then enters into and passes through section 200 of the apparatus, wherein the surface thereof is sensitized and then activated. As illustrated in FIG. 1, and more particularly in FIG. 4, the plate is rinsed, preferably with demineralized water, as it enters section 200 to remove any traces of cerium oxide, red rouge, tap water or any other undesirable matter carried over from section 100. The rinse may be performed in any conventional manner. For example, the plate may be rinsed by reciprocating a single water spray gun transversely of the advancing plate (i.e. in the direction of arrow $x$) while the plate advances in the direction indicated by arrow $y$. However, the rinse is preferably performed by employing a cross-fire technique. As illustrated in FIG. 4, when employing a typical cross-fire technique, a mutually opposed pair of spray guns 201 and 202 are supported from a carriage 203 that reciprocates transversely of the plate 3 on a track 204 at a rate of between about 25 and 70 single passes per minute, and preferably between about 45 and 60 single passes per minute. The carriage 203 is driven by a chain or belt 205 that runs over a pair of pulleys 206 and 207 arranged at the opposing ends of the track 204. A motor 208 drives the chain 205 while a connection 205A between the chain and the carriage slides up and down in the carriage as the connection moves around the pulleys. This construction is similar to that shown in Bramsen et al., U.S. Pat. No. 2,246,502. During the reciprocating motion of the carriage 203, demineralized water is fed to the guns 201 and 202, in intermittent fashion such that water is sprayed only from guns 201 when the carriage is moving from left to right in FIG. 4, while water is sprayed only from gun 202 when the carriage is moving in the opposite direction. As shown, the guns 201 and 202 are tilted slightly toward each other to give a cross-fire effect or sweeping action which tends to wash any excess water from the surface of the plate. The spray guns 201 and 202 may be supplied with water through lines 209 and 210, respectively, by any suitable means. The guns are advantageously operated at pressures between about 25 and 50 p.s.i., preferably between about 25 and 45 p.s.i., and at flow rates of about 500–600 milliliters per minute per gun.

After undergoing an initial rinse with demineralized water, the plate advances beneath a reciprocating gun 211 which sprays a dilute solution of stannous chloride on the clean surface. The stannous chloride solution may comprise any of formulations known in the art as being capable of sensitizing non-conductive substrates to metal deposition. However, a preferred formulation comprises from about 0.02 to about 1.0 gram of stannous chloride per liter of solution, together with a small amount of hydrochloric acid. Such a solution may be prepared, for example, by mixing about 20 grams of stannous chloride and 2–3 milliliters of concentrated hydrochloric acid (12 N) in enough demineralized water to form 1 gallon of stock concentrate, and then diluting each part of the stock concentrate with about 19 parts of demineralized water. In a preferred embodiment, about 1 part of the above-described concentrate is injected into a stream comprising about 19 parts of demineralized water, whereafter the combined stream is mixed with air at about 60 to 80 p.s.i., and sprayed through the nozzle or gun 211 in a highly atomized state at a rate of about 500–700 milliliters per minute.

As illustrated in FIG. 4, the stannous chloride gun may be supported from the same reciprocating carriage 203 that supports the initial rinse guns 201 and 202. In addition, an intermediate set of rinse guns 212 and 213, a palladium chloride gun 214 and a third set of rinse guns 215 and 216 may also be supported from carriage 203.

As the plate 3 continues to advance, it passes under the intermediate or second set of cross-fire rinse guns 212 and 213. These guns are operated in the same manner as guns 201 and 202. The sheet then passes under the palladium chloride gun 214 which sprays an atomized mixture of air and dilute palladium chloride on the now sensitized surface so as to activate the surface for the ensuing metal-boron deposition. As is the case with the stannous chloride solution, the palladium chloride may comprise any of the well known formulations that is suitable for activating a previously sensitized substrate. However, a formulation comprising from about 0.005 to about 1.0 gram of palladium chloride per liter of solution, together with a small amount of hydrochloric acid, is preferred. One such formulation may be prepared by mixing about 2 grams of palladium chloride and 2–3 milliliters of concentrated hydrochloric acid witth a sufficient amount of demineralized water to form 1 gallon of concentrated stock solution, and then diluting each part of the stock solution with 19 parts of demineralized water. As is the case with the stannous chloride solution, the diluted palladium chloride is preferably mixed with air at a pressure of about 60 to 80 p.s.i.g. and sprayed onto the glass plate at a rate of about 500–700 milliliters per minute.

After passing the palladium chloride spray gun and before leaving section 200 of the apparatus, the plate undergoes a third demineralized water rinse. This rinse is carried out in the same manner as the initial and intermediate rinses, and is designed to remove any excess palladium chloride from the advancing plate before it reaches the metal-boron deposition section.

The spacing between the respective guns in section 200 of the apparatus may vary within wide limits depending, for example, upon the rate at which the plate is advancing, the dimensions of the fan-shaped spray pattern generated by each gun, the rate of traverse of each gun, and the like. However, it is preferable to arrange the various guns in section 200 such that the time required for the leading edge of a given plate 3 to advance from each gun or set of guns to the next successive gun or sets of guns is from about 10 to about 90 seconds.

Figure 5:
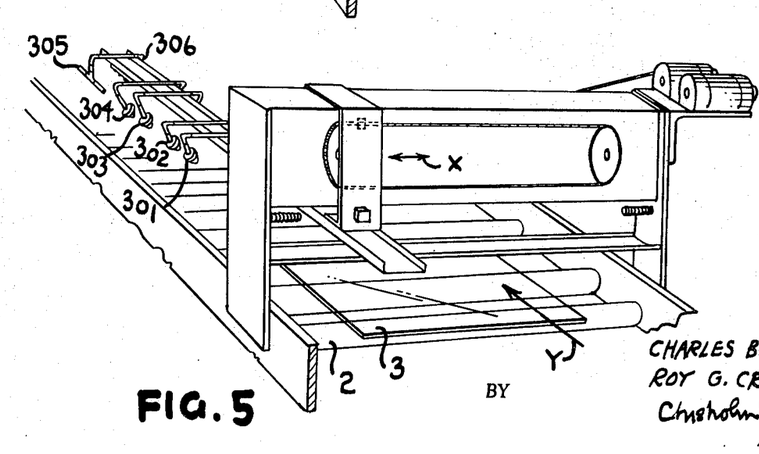
FIG. 5 is a partial perspective view of the metal-boron deposition section of FIG. 1.

As illustrated, the plate then passes from section 200 of the apparatus to section 300 thereof, wherein a metal and boron containing coating, preferably nickel-boron, cobalt-boron, iron-boron or a mixture thereof, is deposited on the now activated surface thereof. The deposition is preferably accomplished by simultaneously spraying and intermixing a metal containing solution and a boron-containing reducing solution onto the activated surface such that the metal ions present in the contemplated metal solution become reduced to a transparent boron containing metal film which tenaciously adheres to the activated surface.

It will be appreciated that the number, disposition, and spacing of the guns which spray the metal solution and the boron-containing reducing solution, and the rate at which they are reciprocated, are determined generally by the rate at which the plate is advanced, the temperature, pH, and concentration of the intermixed film forming composition and the like, and primarily by the time required for the film forming composition to be substantially depleted of its film forming capacity, and the desired thickness and transparency of the deposited film. The importance of these latter two parameters will become more apparent in view of the illustrative examples set forth below.

For the sake of illustration, section 300 is shown to have four guns sets 301–304 each comprising a metal containing solution gun and a mutually opposed reducing solution gun. Section 300 also includes a mutually opposed pair of water spray guns 305 and 306 arranged for cross-fire rinsing. As shown, the gun sets 301–304 are supported for transverse reciprocating movement, for example, in the manner described in connection with FIG. 4. However, it should be noted that the gun sets in section 300 must reciprocate much faster than those in section 200 or than those employed in conventional spray techniques for depositing silver, for example. In this connection, it has been found that uniformly and controllably transparent metal-boron coatings can best be made in accordance with the present invention only when the gun sets in section 300 are reciprocated at a rate of at least about 60 to 65 single passes per minute, and preferably from about 72 to about 76 single passes per minute, when the plates being coated are about 4 feet wide and are advanced at a rate of from about 3 to 4 feet per minute. Thus, for a 4 foot wide plate advanced at a rate of 3½ feet per minute, i.e., 42 inches per minute, a gun set reciprocating at 74 single passes per minute will complete about 1.75 single passes over each inch segment of the advancing plate. Accordingly, if the width of the applied spray in the direction of travel of the plate is say 10 to 12 inches, each inch segment of the plate will receive from about 17.5 to 21.1 applications of solution per gun set. Of course, the required number of passes per minute will vary somewhat in accordance with changes in magnitude of the various parameters discussed herein. For example, the required number of passes would increase when the plates being coated are advanced more rapidly than about 3 to 4 feet per minute.

The guns of each set 301–304 are connected through respective supply lines (not shown) to air under a pressure of about 20 to 45 p.s.i.g. In turn, the respective supply lines are in fluid communication with prepared metal and reducing solutions stored in separate solution tanks or containers (not shown), preferably of such size to hold a reasonable supply of fluid, such that when the prepared solutions are injected into the supply lines by any conventional means (not shown) the solutions are fed through the lines and sprayed from the guns in a fan-shaped pattern. It will be appreciated that the magnitude of air pressure required for satisfactory spraying varies considerably with the design of the guns and the various parameters of the solutions employed. In this connection, satisfactory results have been obtained with pressures as low as about 20 p.s.i.g. and as high as about 55 p.s.i.g. Pressures in the range of about 25 to about 40 p.s.i.g. are preferred. The rates at which the respective prepared solutions are sprayed from each gun may vary, but it is preferred that the rates of flow be maintained at about 300 to about 2000 milliliters per minute per gun.

Figures 6, 7, 8, 9, 10:
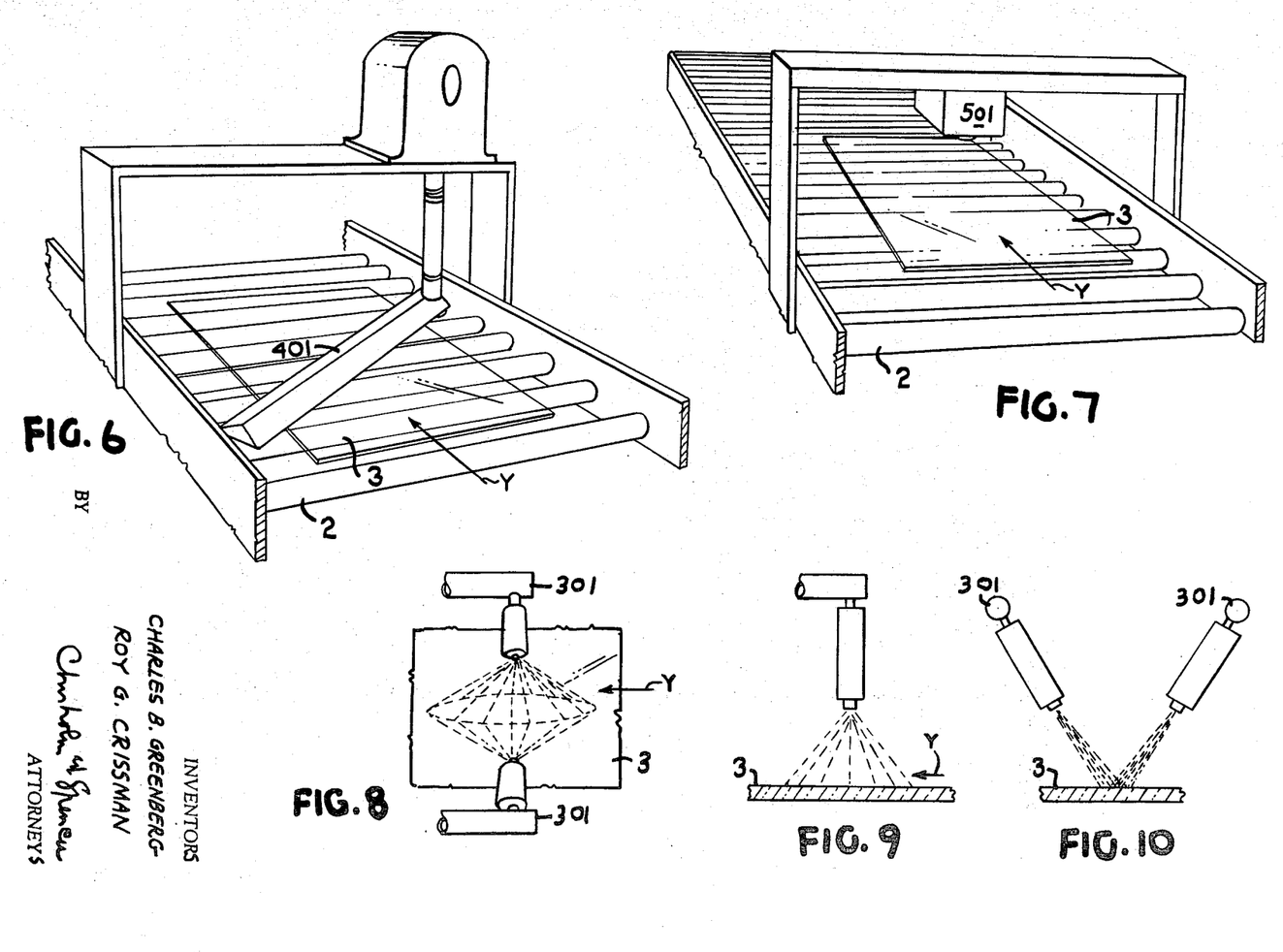
FIG. 6 is a partial perspective view of the drying section of FIG. 1.
FIG. 7 is a partial perspective view of the film density measuring and unloading section of FIG. 1.
FIGS. 8, 9 and 10 are a schematic top plan view, a schematic side elevational view, and a schematic front elevational view, respectively, of one of the four sets of metal solution-reducing solution spray guns of section 300 of FIG. 1, illustrating the disposition of the spray guns relative to each other and to an advancing glass substrate, and illustrating the fan-shaped pattern assumed by the respective solutions being sprayed.

As illustrated in FIGS. 8, 9 and 10, each of the guns in the metal depositing gun sets 301–304 is preferably designed to provide a substantially fan-shaped stream which opens only a few degrees in direction transverse to the advancing plate, and which opens in the direction of travel of the plate such that stream contacts the advancing plate in an elliptical pattern having a major diameter of from about 8 to about 14 inches, and preferably from about 10 to about 12 inches in length (FIG. 8).

The guns in each metal-salt reducing solution set are also arranged to have an included angle of from about 80 to 120 degrees between the streams, i.e., each of the metal salt solution guns is inclined from about 40 to 60 degrees toward a mutually opposed reducing solution gun, and vice versa (FIG. 10). This arrangement is desirable so that the metal and reducing solutions are effectively and thoroughly mixed as they approach and strike the surface of the activated glass plate.

As the plate advances beyond the first and second set of metal depositing guns 301 and 302, respectively, and toward the third and fourth set of guns 303 and 304, respectively, the intermixed film forming composition which is uniformly distributed on the surface of the plate is permitted to rest relatively quietly. This quiescent period or period of minimum turbulence is highly desirable since it enables the film forming composition to deposit a transparent coating which is substantially free from visual defects normally attritbuted to turbulence or agitation of the filming composition during deposition. In addition, it is during this quiescent period that the intermixed filming compositions contemplated herein undergo a change in their capacity for depositing a film such that the rate of film deposition, which is initially relatively rapid, decreases and then effectively completely ceases while the deposited film is still transparent. While the time required for this change in filming capacity to occur will vary considerably depending upon the chemistry of the actual filming composition employed, a filming composition comprising equal amounts of the nickel acetate solution and borohydride reducing solution illustrated respectively in Tables 1 and 2 will normally undergo a substantial decrease in its filming, e.g. five minutes. In this regard, seconds to a few minutes, e.g. five minutes. In this regard, a glass plate that is coated with a metal and boron containing film at room temperature by a single fifteen second spray application of the above illustrated intermixed filming composition will normally have a luminous transmission of from about 30 to about 30 percent when the filming capacity of the composition has depleted and filming has effectively ceased.

Referring once again to FIGS. 1 and 5, it will be appreciated that once the film forming composition has become dead, i.e. depleted of its filming capacity, it may be removed from the plate by any convenient means without affecting the thickness, and thus the transparency of the film. It will also be appreciated that the lowest degree of transparency obtainable will depend primarily upon the amount of film that will deposit from a given film forming composition before it becomes dead, the number of gun sets in section 300, and the distance between each gun set. The effect of these variables on the thicknes, uniformity and transparency of metal-boron films formed in accordance with this invention will be more fully appreciated in light of the examples hereinbelow.

After undergoing the quiescent period between gun sets 301–302, and gun sets 303–304, the plate has a luminous transmittance of about 35 to 45 percent. The plate then passes beneath the third and fourth gun sets 303–304 in section 300 and undergoes a second quiescent period designed to allow the partially formed metal-boron film to increase in thickness in the substantial absence of adverse effects caused by turbulence. Even more important, however, this period is designed to allow sufficient time for the film forming composition on the surface of the plate to become substantially depleted of its filming capacity so that the rate of deposition of the metal-boron film will have materially slowed down, and preferably effectively ceased, before the plate is cross-fire rinsed under rinse guns 305 and 306. In this latter connection, it will be appreciated that the necessary distance between the rinse guns 305 and 306 and the last metal depositing gun set 304 is related to the rate at which the plate is advanced. Thus, when maintaining all of the various parameters within the bounds described herein, the distance between the final rinse guns 305 and 306 and the last gun set 304 should be at least about 30 inches, and preferably at least about 35 to 40 inches to provide a final film thickness corresponding to a luminous transmittance of about 20 percent.

After undergoing a final water rinse under guns 305 and 306, the plate advances into section 400 of the coating apparatus where it is dried by means of a suitable air knife 401. (FIG. 6). The air knife 401 may comprise any conventional blow-off device, but it is preferred to employ a high volume-low pressure knife to avoid disturbing the quality of the metal-boron film. For example, it is desirable to employ a knife that operates at a pressure of about 3–7 ounces per square inch, while forcing from about 300 to 400 cubic feet of air per minute against the metal-boron coated glass plate.

After passing beneath the air knife, the completed metal-boron coated plate passes into section 500 where the thickness of the deposited film is measured by a conventional measuring device 501. Thereafter, the transparent glass plate is removed from the rollers 2 and is ready for use.

The present invention is applicable in forming transparent metal-boron films on clear plastic (e.g. polymethyl methacrylate) and glasses, especially soda-lime-silica glasses, but can be used to film a wide variety of glass, ceramic, glass-ceramic, siliceous and calcareous base compositions. For example, this invention can be used to provide metal-boron and particularly nickel-boron films on the following types of glasses; soda-lime-silica glasses; alkali-alumina-silica glasses, such as those containing lithia as a component alkali; alkali-zirconia-silica glasses; alkali-alumina-zirconia-silica glasses; borosilicate glasses, etc. Bearing this in mind, the present invention is described hereinbelow with specific reference to soda-lime-silica glass.

The soda-lime-silica glass to be treated can be a clear glass or it can be a colored glass tinted by the introduction of various conventional materials into the glass forming batch. These latter glasses are often referred to as heat absorbing glasses especially when they contain iron oxide. Representative soda-lime-silica glass bases which can be treated in accordance with this invention usually contain 65 to 75 percent by weight $SiO_2$, 10 to 18 percent by weight $Na_2O$, 5 to 15 percent by weight CaO, 1 to 5 percent by weight MgO, 0 to 1.0 percent by weight $Na_2SO_4$, 0 to 5 percent by weight aluminum oxide ($Al_2O_3$), 0 to 8 percent by weight $K_2O$, 0 to 8 percent by weight $B_2O_3$, 0 to 1 percent by weight iron oxide ($Fe_2O_3$), and 0 to 0.7 percent by weight of NaCl, $SO_3$, $As_2O_5$, BaO, NiO, CoO and Se and combinations thereof.

A representative range of composition for soda-lime-silica glasses is listed as follows (wherein the given amounts of metals listed are determined as their oxides, except as otherwise noted)—

| Component: | Percent by weight |
|---|---|
| $SiO_2$ | 68–73.5 |
| $Na_2O$ | 12–17 |
| CaO | 7–12 |
| MgO | 2–4 |
| $Na_2SO_4$ | 0–0.8 |
| NaCl | 0–0.3 |
| $Fe_2O_3$ | 0.05–0.09 |
| $Al_2O_3$ | 0–3.5 |
| $B_2O_3$ | 0–6 |
| $K_2O$ | 0–1.5 |
| $As_2O_5$ | 0–0.5 |
| BaO | 0–0.7 |
| NiO | 0–0.1 |
| CoO | 0–0.1 |
| $SO_3$ | 0–0.5 |
| Se | 0–0.1 |

This invention will be further understood from the specific examples which follow. It should be noted, however, that the present invention is not necessarily limited to the specific materials, temperatures, contact times, and pH values noted in the below examples.

EXAMPLE 1

A 40 inch by 40 inch by one-quarter inch commercial soda-lime-silica glass plate was coated with a nickel-boron film with the apparatus illustrated schematically in FIG. 1. The blockers employed in these examples were four in number and comprised 3 inch thick cattle hair felt discs of 8 inch diameter. The blockers were arranged at 12 inch centers in the direction parallel to the rollers, hereinafter referred to as the transverse direction, and were rotated at about 350 r.p.m. The blockers were also oscillated about 4 inches in the transverse direction at a frequency of 15 cycles per minute. Four 6 inch diameter rotary cup brushes were arranged at 12 inch centers in the transverse direction such that the longitudinal distance between the blockers and the rotary cup brushes was about 9 inches. The rotary cup brushes were equipped with #12 nylon bristles and were rotated at about 350 r.p.m. The brushes were also oscillated about 4 inches in the transverse direction at a frequency of 15 cycles per minute. During operation, the blockers were supplied with a mixture cerium oxide and tap water, while a spray of tap water was applied beneath the rotary cup brushes. The rotary cylinder brush had a 6 inch diameter, comprised #12 nylon bristles, and had its axis disposed 8 inches from rotary cup brushes. The first, second and third cross-fire rinse guns, as well as the tin gun and the palladium gun, i.e., all of the guns in section 200, were mounted from a single boom that reciprocated in the transverse direction at a rate of 54 single passes per minute. Each of the rinse guns comprises a single UniJet-T8001 spray nozzle (Spraying Systems Co., Bellwood, Ill.) operated at a pressure of about 40 p.s.i. and an average flow rate of about 0.12 gallon of demineralized water per minute. Each of the tin and palladium guns comprised a single type C spray gun equipped with a Paasche U2, F2-8 nozzle (Paasche Air Brush Co., Chicago, Ill.) operated at an air pressure of about 70 p.s.i. and a flow rate of about 500 milliliters of the solution described below per minute. The distance between the rotary cylinder brush and the first cross-fire rinse guns 201 and 202 was 36 inches, while the distance from each gun or gun set in section 200 to the next respective gun or gun set was 18 inches.

The gun sets in section 300 of the apparatus were spaced apart from those in section 200 such that the distance between the last rinse guns in section 200 and gun set 301 was 54 inches. In addition, gun set 301 was spaced 17 inches from gun set 302, while gun set 302 was spaced 32½ inches from gun set 304. Gun set 303 was not used. The distance between the tip of the nickel solution gun and the tip of the reducing solution gun in each respective set was about 10 inches. All of the guns in section 300 employed Paasche U2, F2-8 nozzles, which are arranged so that the tip of each nozzle was about 7½ inches above the surface of the glass being coated, and so that each respective gun set generated a fan-shaped stream of intermixed film forming solution that contacted the glass surface in a generally elliptical pattern having a major diameter of about 11 inches extending in the longitudinal direction. All of the gun sets in section 300 were mounted from a single boom that reciprocated in the transverse direction at a rate of 74 single passes per minute. During operation, each of the metal deposition gun sets in section 300 was maintained at a pressure of about 40 p.s.i. and a flow rate of about 600 milliliters of solution per minute, while the final cross-fire guns 305–306 were operated at a pressure of about 40 p.s.i. and an average flow rate of about 0.12 gallon of demineralized water per minute. The distance between these guns (305–306) and the last metal depositing gun set 304 was about 40 inches. The air knife 401 comprised an elongated metal housing having a 0.002 inch delivery channel extending along the length thereof. The knife 401 was disposed at a 45° angle relative to the advancing plate and had its centermost portion spaced about 48 inches from the final rinse guns. The air knife was operated at about 5 p.s.i. and a flow rate of about 350 c.f.m. The ambient air temperature was about 82° F., while the temperature of the demineralized and top water used throughout these examples was about 63° F. The glass plate was advanced at a rate of 3½ feet per minute. On the basis of a liter of solution, each of the prepared aqueous solutions employed had the following composition:

Nickel solution

| | Grams |
|---|---|
| Nickelous acetate | 5 |
| Boric acid | 2.5 |
| Sodium gluconate | 9.0 |
| Hydrazine sulfate | 0.5 |
| Water, added to 1 liter. | |
| Ammonium hydroxide, added to pH 7.4. | |
| Ethomeen C-20 [1] | 0.06 |

[1] Ethomeen C-20 (trademark of Armour and Company) is a cocoamine having an average molecular weight of 645 and the following generalized formula:

wherein R is derived from a cocoamine and $x+y$ equals 10.

Reducing solution

| | |
|---|---|
| Sodium borohydride | 0.5 gram. |
| Water | Added to 1 liter. |
| Sodium hydroxide | Added to pH 11.6. |
| Ethomeen C-20 | 0.30 gram. |

Tin solution

| | |
|---|---|
| Stannous chloride | 0.20 gram. |
| Hydrochloric acid (12 N) | 0.04 milliliter. |
| Water | Added to 1 liter. |

Palladium solution

| | |
|---|---|
| Palladious chloride | 0.02. |
| Hydrochloric acid (12 N) | 0.04 milliliter. |
| Water | Added to 1 liter. |

The temperature of each of these solutions was about 70° F. The pH of the intermixed nickel and borohydride solution was about 7.7. A nickel film was formed which contained about 5 percent by weight boron and the resulting coated plate had a luminous transmission of about 23 percent. The film was very adherent to the glass plate and was very uniform in appearance. The film had an initial resistivity of 300 ohms per square.

The procedure was utilized to prepare several samples. The results were very reproducible. Uniform films of a desired light transmission could be produced in continuous fashion.

EXAMPLE 2

A cobaltous chloride solution was utilized to form a transparent cobalt and boron containing film. The processing conditions were similar to those set forth in Example 1 except that the cobalt solution and reducer solution were formulated as follows:

Cobalt solution

| | |
|---|---|
| Cobaltous chloride | 12 grams. |
| Boric acid | 3 grams. |
| Sodium gluconate | 9 grams. |
| Hydrazine sulfate | 0.5 gram. |
| Water | Added to 1 liter. |
| Ammonium hydroxide | Added to pH 7.6. |
| Ethomeen C-20 | 0.06 gram. |

Reducing solution

| | |
|---|---|
| Potassium borohyride | 0.75 gram. |
| Water | Added to 1 liter. |
| Sodium hydroxide | Added to pH 11.3. |
| Ethomeen C-20 | 0.03 gram. |

The resulting cobalt film comprised about 96 percent by weight cobalt and about 4 percent by weight boron, and the resulting coated plate had a luminous transmission of about 21 percent. The film was very adherent and was substantially free from visible defects.

EXAMPLE 3

A mixed nickel acetate and cobalt propionate solution was utilized to form a transparent cobalt-nickel and boron containing film. The process conditions were similar to those employed in Example 1 except that the nickel solution was replaced with a cobalt-nickel solution having the following composition:

Metal solution

| | |
|---|---|
| Cobalt acetate | 4 grams. |
| Nickel propionate | 10 grams. |
| Boric acid | 2.5 grams. |
| Sodium gluconate | 7 grams. |
| Hydrazine sulfate | 0.7 gram. |
| Water | Added to 1 liter. |
| Ammonium hydroxide | Added to pH 7.2. |
| Ethomeen C-15 [1] | |

[1] Ethomeen C-15 (trademark of Armour and Company) is a cocoamine having an average molecular weight of 422 and the following generalized formula:

wherein R is derived from a cocoamine and $x+y$ equals 5. A transparent film was obtained that was very uniform and adherent. The light transmission of the coated plate was about 23 percent.

EXAMPLE 4

An iron sulfate solution was utilized to form a transparent film containing iron and boron. The processing conditions were similar to those set forth in Example 1 except that the iron solution and reducer solution were formulated as follows:

Iron solution

| | |
|---|---|
| Ferrous sulfate | 10 grams. |
| Boric acid | 3 grams. |
| Sodium gluconate | 7 grams. |
| Hydrazine sulfate | 0.6 gram. |
| Water | Added to 1 liter. |
| Ammonium hydroxide | Added to pH 7.5. |
| Ethomeen C-20 | 0.06 gram. |

Reducing solution

| | |
|---|---|
| Potassium borohydride | 0.75 gram. |
| Water | Added to 1 liter. |
| Sodium hydroxide | Added to pH 11.3. |
| Ethomeen C-20 | 0.03 gram. |

The resulting iron film comprised about 94 percent by weight iron and about 6 percent by weight boron. The coated plate had a luminous transmission of about 26 percent. The film was substantially free from visual defects.

EXAMPLE 5

In a series of runs, a plurality of commercial soda-lime-silica glass plates were coated with a nickel-boron film in a manner generally similar to that described in Example 1, except that only one metal depositing gun set, i.e., set 301, was employed. In addition, each sheet was rinsed free from the nickel forming composition after a predetermined period of time. The various solutions employed were the same as those employed in Example 1. The contact time and luminous transmittance of each plate is noted below. A plot of the luminous transmittance as a function of the contact time appears in FIG. 11.

| Sample | Contact time, seconds | Luminous transmittance, percent |
|---|---|---|
| 1 | 17 | 49 |
| 2 | 27 | 46 |
| 3 | 37 | 43 |
| 4 | 47 | 42 |
| 5 | 57 | 41 |
| 6 | 67 | 38 |
| 7 | 77 | 36 |
| 8 | 87 | 34 |
| 9 | 132 | 32 |
| 10 | 160 | 32 |

Figure 11:
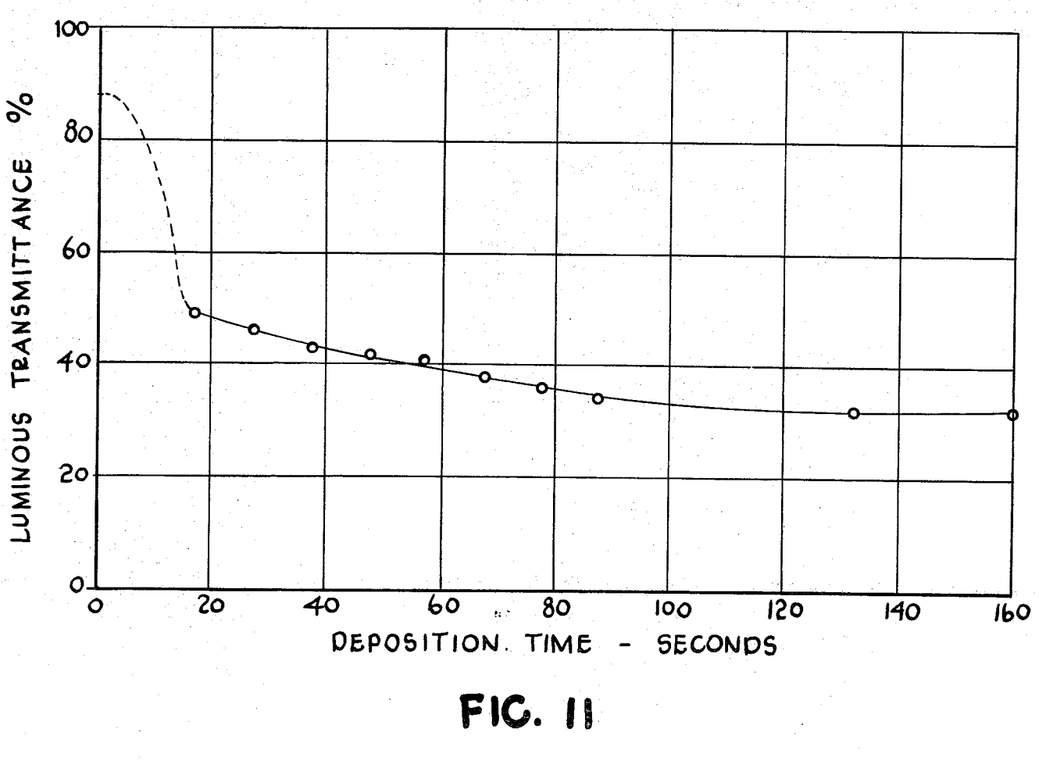
FIG. 11 is a graph illustrating the manner in which a film forming composition embodying the principles of the present invention becomes essentially completely depleted of its film forming capacity while the film deposited thereby is still transparent.

Referring to FIG. 11, it is evident that the luminous transmittance of the respective nickel-boron coated plates decreased rapidly from about 88 percent, i.e. the transmittance level of an uncoated glass plate, to about 49 percent in the first 17 seconds of deposition, i.e. the time required for each plate to pass under the entire fan-shaped spray pattern applied by gun set 301. It is equally evident that as the plates advanced past gun set 301 and toward the air knife 401, the filming composition on the plates was rapidly depleted of its filming capacity such that the decrease in luminous transmittance slowed down and effectively ceased after about 130 seconds, whereafter the luminous transmittance remained at essentially 32 percent.

EXAMPLE 6

The procedure of Example 5 is followed, except that gun set 304 is employed in addition to gun set 301 to determine the effect of applying fresh filming solution to partially filmed plates. The contact time and luminous transmittance of each plate subjected to the application of film composition from gun set 304 were noted. A plot of the luminous transmittance as a function of the contact time appears in FIG. 12.

| Sample | Contact time, seconds [1] | Luminous transmittance, percent [1] |
|---|---|---|
| 1 | 17 | 46 |
| 2 | 27 | 46 |
| 3 | 37 | 43 |
| 4 | 47 | 42 |
| 5 | 57 | 41 |
| 6 | 67 | 38 |
| 7 | 137 | 19 |

[1] Data for samples 1-6 taken from Example 5.

Figure 12:
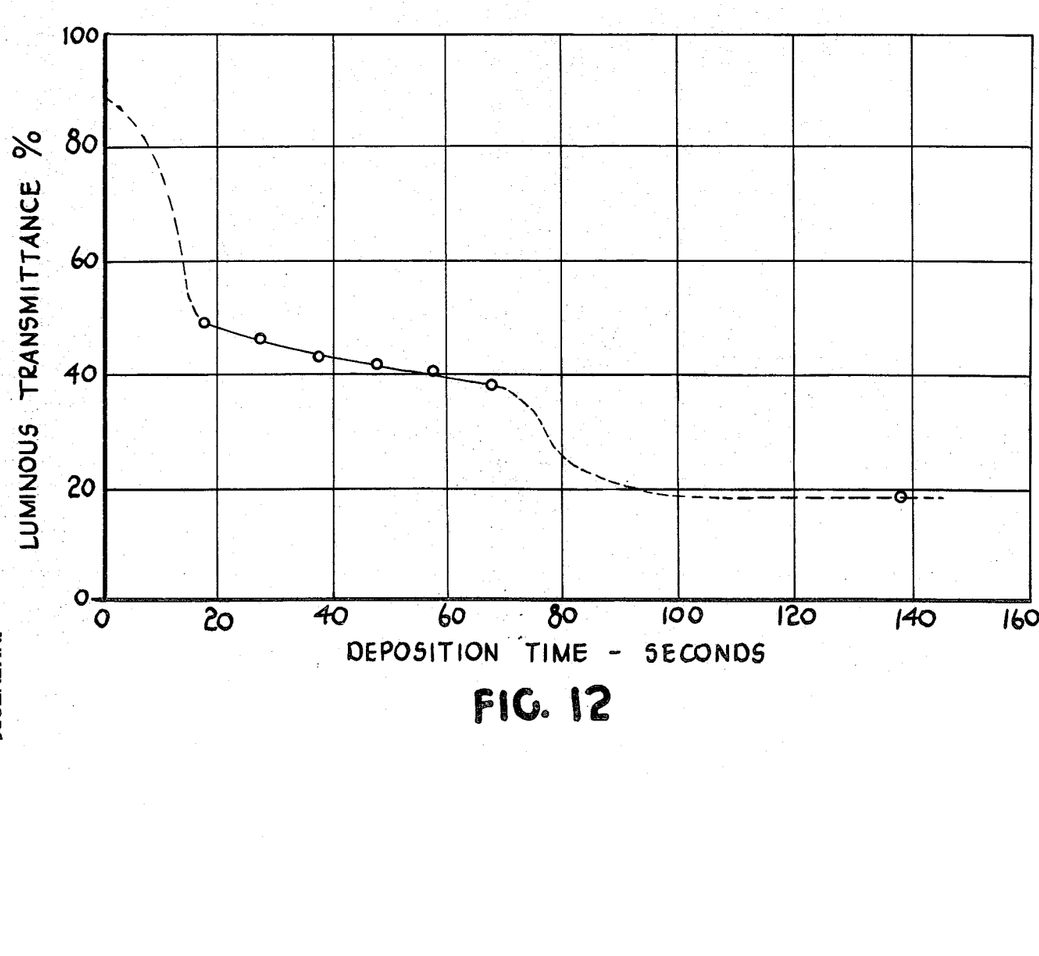
FIG. 12 is a graph similar to FIG. 11 illustrating the manner in which the spraying of fresh film forming composition onto a partially filmed substrate will decrease the transparency of the final filmed substrate.

Referring to FIG. 12, it is evident that the addition of fresh filming composition to a partially filmed plate again reduces the luminous transmittance of the plate, first rapidly and then slowly, until the filming composition is spent of its filming capacity. At this point the luminous transmittance of the deposited film is about 19 percent.

EXAMPLE 7

The procedure of Example 5 is repeated, except that in respective series of runs, (1) the concentration of the borohydride solution is reduced by 20 percent, (2) the concentration of the borohydride solution is increased by 20 percent, (3) the concentration of the nickel solution is increased by 20 percent and (4) the concentration of both the nickel solution and the borohydride solution is increased 20 percent. All other conditions are the same as in Example 5. It is found that changing the borohydride solution concentration significantly affects the luminous transmittance of the resulting films and that higher borohydride concentrations result in film having correspondingly lower luminous transmittance levels. It is also found that changing the nickel solution concentration, or changing both the nickel solution concentration and the borohydride solution concentration has little effect on the luminous transmittance of the resulting films.

EXAMPLE 8

The procedure of Example 5 is repeated, except that in respective series of runs, the pH of the nickel solution and/or the borohydride solution is modified. All other conditions are the same as in Example 5. It is found that raising the pH of the nickel solution and/or raising the pH of the borohydride solution decreases the luminous transmittance of the resulting films. However, it is also found that the quality characteristics of the resulting films, i.e., mottle, texture, streaks, etc., are deteriorated by increasing the pH of the respective solutions. In this latter connection, films deposited to a predetermined percent luminous transmittance with a filming composition comprising a relatively high pH nickel solution and a relatively low pH borohydride solution exhibit markedly superior quality characteristics when compared to films of equal luminous transmittance prepared with filming compositions comprising a relatively low pH nickel solution and a relatively high pH borohydride solution. Accordingly, it appears that the quality deterioration is somehow due to the solution chemistry of the higher pH borohydride solutions and that the pH of the borohydride solutions should be maintained below about 12.5, and preferably between about 11.2 and 11.7.

EXAMPLE 9

The procedure of Example 6 is followed except that coating composition is applied through as many as seven gun sets arranged along approximately the same length of longitudinal distance as the space between gun sets 301 and 304. Using identical substrates and filming compositions while varying both the line speeds and/or rates of spray gun reciprocation, the films resulting from the Example 9 experiments, while superior in texture to those of the prior art for the most part, on occasion were more mottled than those produced from the Example 6 experiments.

It is only in the light of the present invention that it was appreciated why Example 6 produced more consistent results than Example 9. The present invention is based on the recognition of the fact that superior film quality resulted when a second contact of the filming composition with the substrate substrate occurred after the rate of nickel reduction was relatively slower and superior film quality resulted with less consistency when each succeeding contact of the coating composition on the substrate took place while the rate of nickel reduction was relatively rapid.

Although specific embodiments of the instant invention have been set forth hereinabove, the invention is not intended to be limited thereto but includes all of the modifications and variations within the scope of the following claims.

What is claimed is:

1. A method of providing a transparent substrate that is receptive to metal deposition with a transparent coating having visible light transmittance below about 25 percent which comprises:

sequentially applying to said substrate in at least two contacting steps each comprising contacting the substrate with two aqueous solutions, one of said solutions comprising a borohydride reducing agent and one solution comprising a reducible constituent selected from the group consisting of iron, cobalt, nickel and mixtures thereof wherein the borohydride reducing agent and the reducible constituent are present in such proportions as to provide for the effective reduction of the reducible constituent by the borohydride reducing agent to deposit a metal film on the substrate, and providing in a location at or adjacent the point of admixture of said aqueous solutions, in each of said contacting steps, a nitrogen-hydrogen compound selected from the group consisting of hydrazine, hydrazine salts, hydroxylamines, phenylhydrazine and mixtures thereof in an effective amount to retard the reduction and deposition of the selected reducible constituent, said solutions intermixing as an applied coating mixture to deposit a film on the substrate at a rate which is relatively rapid, then relatively slower and, thereafter, effectively ceases, and applying each said sequentially applied coating mixture to the substrate after said next prior coating mixture deposition is at the relatively slower rate and substantially immediately before said next prior coating mixture ceases effectively to deposit a transparent coating on said substrate.

2. The method of claim 1 wherein said reducible constituent is nickel and said substrate is a glass.

3. The method of claim 1 wherein said reducible constituent is cobalt and said substrate is a glass.

4. The method of claim 1 wherein said reducible constituent is iron and said substrate is glass.

5. The method of claim 1 wherein said reducing agent effectively ceases to reduce said selected reducible constituent within about 3 minutes after said reducing agent and said selected reducible constituent substantially simultaneously contact a receptive substrate.

6. The method of claim 1 wherein the process is carried out at a temperature of about 20° C. to 30° C.

7. The method of claim 1 wherein said first of said series of coatings reduces the luminous transmittance of said partially coated substrate to about 35–45 percent, and the second of said series of coatings reduces said luminous transmittance to below about 25 percent.

8. The method of claim 1 wherein said reducing agent comprises an alkali metal borohydride.

9. The method of claim 8 wherein said reducing agent comprises a water soluble borohydride and said nitrogen-hydrogen compound is a hydrazine salt.

10. The method of claim 8 wherein a mixture of said reducing agent and said aqueous solution of the selected reducible constituent in relative amounts to deposit said coating contains a sufficient amount of alkaline material to provide said mixture with an initial pH between about 7 and 8.5.

11. A method of forming transparent metal films on a glass substrate which comprises:
- activating said substrate for metal deposition by first applying to said substrate an aqueous stannous chloride sensitizing solution and thereafter applying to the resulting sensitized substrate an aqueous activating solution of a noble metal selected from the group consisting of salts of palladium and platinum;
- contacting the resultant activated substrate substantially simultaneously with an aqueous metal salt solution having a pH of about 7.2 to 7.6 and an aqueous reducing solution having a pH of about 11 to about 12.5, said metal salt and reducing solutions intermixing at the glass surface to form a filming composition having a pH of about 7 to 8.5 and a capacity to reduce said metal salt and thereby deposit said coating at a rate which is relatively rapid and then relatively slower,
  - (1) said capacity to reduce said metal salt effectively ceasing before the luminous transmittance of the coated substrate decreases to about 25 percent,
  - (2) said metal salt solution comprising boric acid, hydrazine sulfate and chelated salt of a metal selected from the group consisting of nickel, iron, cobalt and mixtures thereof, and
  - (3) said reducing solution containing an alkali metal borohydride; repeating said contacting step after the rate of deposition of the coating deposited by each previous contacting step has reached said slower rate and substantially immediately before the next prior filming composition ceases effectively to deposit a coating on said substrate; and
- discontinuing said contacting after the rate of deposition of the coating deposited by the immediately previous contacting step has reached said slower rate and after the luminous transmittance of the coated substrate has decreased below about 25 percent.

12. The method of claim 11 wherein said aqueous metal salt solution and said reducing solution are sprayed into contact with said activated substrate.

13. The method of claim 11 wherein each liter of the metal salt solution comprises about 0.5 to 50 grams of nickelous acetate, about 0.5 to 35 grams of boric acid, about 1.0 to 75 grams of sodium gluconate, about 0.1 to 5.0 grams of hydrazine sulfate, and wherein said reducing solution comprises about 0.1 to 25 grams of sodium borohydride per liter of solution.

14. The method of claim 12 wherein the metal salt is metal acetate.

15. The method of claim 12 wherein the metal salt solution and the reducing solution are each sprayed at substantially the same rate.

16. The method of claim 13 wherein each of the metal salt and reducing solutions further comprises a wetting agent.

17. The method of claim 14 wherein the metal acetate is nickel acetate.

18. The method of claim 13 wherein the process is carried out at a temperature of about 20° to 30° C.

19. The method of claim 16 wherein the wetting agent is a cocoamine-ethylene oxide condensate having a molecular weight of about 645.

References Cited
UNITED STATES PATENTS

| | | | |
|---|---|---|---|
| 2,956,900 | 10/1960 | Carlson et al. | 117—160 R |
| 3,140,188 | 7/1964 | Zirngiebl et al. | 117—160 R |
| 3,489,576 | 1/1970 | Vincent et al. | 117—160 R |
| 3,556,839 | 1/1971 | Roy | 117—47 R |
| 3,379,556 | 4/1968 | Chieechi | 117—54 |
| 3,457,138 | 7/1969 | Miller | 117—54 |
| 3,058,845 | 10/1962 | Hendricks | 117—35 S |
| 2,580,718 | 1/1952 | Banks et al. | 117—47 R |
| 3,403,035 | 9/1968 | Schneble et al. | 117—47 A |
| 2,759,848 | 8/1956 | Hilemn | 117—35 |
| 3,483,029 | 12/1969 | Koretzky et al. | 117—236 |
| 3,532,541 | 10/1970 | Koretzky et al. | 117—47 A |

MURRAY KATZ, Primary Examiner

W. K. TRENOR, Assistant Examiner

U.S. Cl. X.R.

117—355, 47 A, 47 R, 54, 105.5, 1246, 130 E, 160 K, 211, 229; 106—1